United States Patent [19]

Sturm

[11] 4,224,505
[45] Sep. 23, 1980

[54] ELECTRICALLY WELDING PLASTIC SLEEVE

[75] Inventor: Werner Sturm, Hagendorf, Switzerland

[73] Assignee: Von Roll AG, Switzerland; a part interest

[21] Appl. No.: 911,091

[22] Filed: May 31, 1978

[30] Foreign Application Priority Data

Jun. 3, 1977 [CH] Switzerland ................... 6890/77

[51] Int. Cl.² ........................................... H05B 3/58
[52] U.S. Cl. .................................. 219/544; 156/380; 219/535; 285/21
[58] Field of Search .................... 219/219, 523, 451, 219/535, 541, 544; 156/86, 275, 293, 380; 264/27, 272, 275, 332; 425/143, 144; 338/217, 218; 174/84 S; 285/21, 292; 339/176

[56] References Cited

U.S. PATENT DOCUMENTS

| | | | |
|---|---|---|---|
| 3,062,940 | 11/1962 | Bauer et al. | 219/544 |
| 3,519,799 | 7/1970 | Bange | 339/176 R X |
| 3,542,402 | 11/1970 | Caples et al. | 385/21 |
| 3,560,704 | 2/1971 | Albert | 219/541 X |
| 3,849,630 | 11/1974 | Halliday | 219/535 |
| 3,943,334 | 3/1976 | Sturm | 219/544 |
| 3,987,276 | 10/1976 | Vogelsanger et al. | 219/535 |
| 4,117,311 | 9/1978 | Sturm | 219/544 |
| 4,147,926 | 4/1979 | Stähli | 219/535 |

FOREIGN PATENT DOCUMENTS

| | | | |
|---|---|---|---|
| 217080 | 11/1956 | Australia | 219/544 |
| 211042 | 9/1960 | Austria | 285/21 |
| 1048106 | 12/1958 | Fed. Rep. of Germany | 285/21 |
| 1055305 | 4/1959 | Fed. Rep. of Germany | 219/544 |
| 396536 | 1/1966 | Switzerland | 219/544 |
| 398957 | 3/1966 | Switzerland | 219/544 |

Primary Examiner—Volodymyr Y. Mayewsky
Attorney, Agent, or Firm—Roylance, Abrams, Berdo & Farley

[57] ABSTRACT

The disclosed sleeve is of the type including a resistance heating wire embedded in a thermoplastic sleeve material. A first sleeve member of insulating thermoplastic is molded with axially spaced integral annular receptacle wall members extending out from the outer surface and defining recesses. The walls have two diametrically opposite guide slots. Extending upwards from the center of each recess is a wire support stud. A resistance wire wound on the first sleeve between the wall members has its end sections passed through the slots and over the support stud, so that portions of the wire lie exposed against the side faces of the stud. A second sleeve member of insulating material is molded over the first sleeve so that the wire is embedded in the second sleeve but remains exposed within the recesses. The second sleeve material fills in the slots above the wire to thereby fix the wire in place in the slots. This permits a mating connector element to be inserted in the recess with its bore receiving the wire and wire support, so that electrical contact is made to the wire.

12 Claims, 5 Drawing Figures

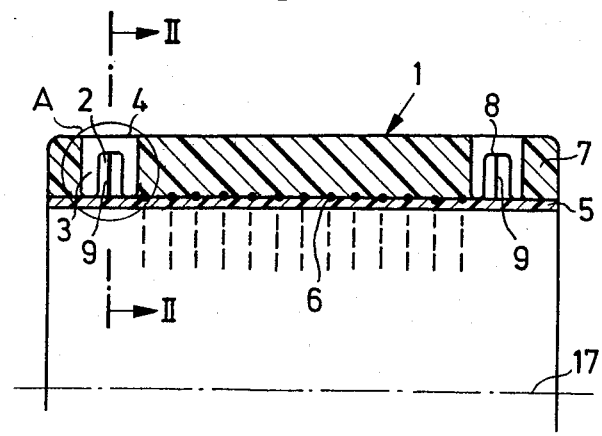
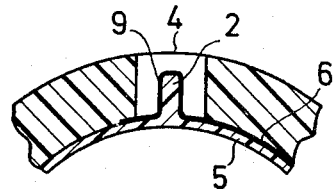
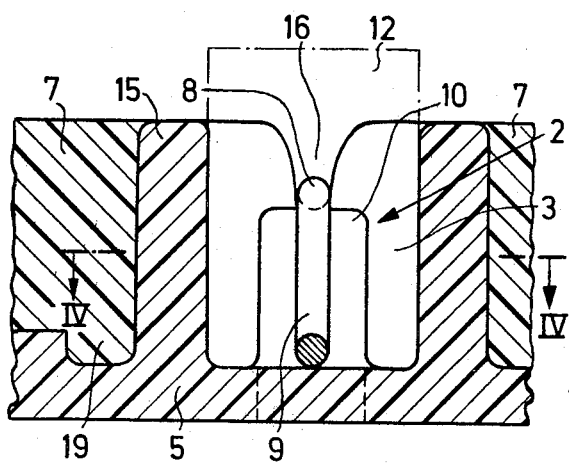
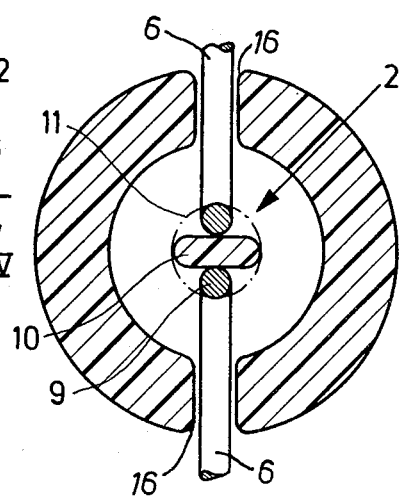
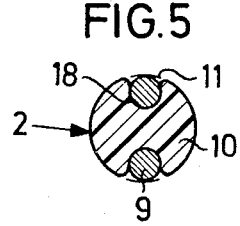

ELECTRICALLY WELDING PLASTIC SLEEVE

BACKGROUND OF THE INVENTION

The invention relates to a plug connection for a welding muff and an electrically welding plastic sleeve having on the inside of a sleeve member an electrical resistance heating wire whose end sections are formed over support members into contacts.

Various methods are known for the production of electrically welding plastic sleeves with which it is possible to produce a connection between sections of pipes and/or shaped members and fittings by heating the joint by electrical resistance heating. The welding sleeves have a sleeve member in the inside of which is appropriately embedded the electrical resistance heating wire necessary for heating purposes. The sleeve member can either be constructed as a one-part tubular member or as a multipart member whose individual parts are produced successively.

In order to connect the resistance heating wire of such a welding sleeve with a power supply, there are provided on the outside of the sleeve connections, particularly plug and socket connections, which on the one hand bring about a satisfactory electrical contact and on the other provide reliable protection against electric shocks. In general, the manufacture of such plug and socket connections constitutes an expensive operation in the manufacture of the welded sleeve. Separate parts used for the plug and socket connection must be connected with the resistance heating wire, or the ends of the wire can be passed through the sleeve member and shaped in an appropriate manner to form an element of a plug and socket connection, e.g. a contact pin or stud. Difficulties are encountered in inserting the ends of the coiled resistance heating wire through to the outside of the sleeve member, due to inadequate supporting or guidance of the end of the wire.

It would be desirable to so further develop a plug connection and welding muff of the type indicated hereinbefore so that it is possible to produce the welding sleeve, and in particular its electrical connections, with limited expenditure and reliable guidance of the end of the wire.

SUMMARY OF THE INVENTION

According to the present invention there is arranged on a novel sleeve member a receptacle in which the end of the resistance heating wire is supported and is held during the winding of the resistance heating wire on the sleeve member.

In the case of the welding sleeve produced by the method of the invention, the contact of the coil of resistance heating wire is constructed as a support member extending in a recess in the sleeve member and on which is supported the end section of the resistance heating wire in such a way that it can be secured in a plug and socket connection.

Thus, even when using the end of the resistance heating wire as a contact, a reliable, durable electrical connection with a completely satisfactory protection against electric shocks is obtained.

BRIEF DESCRIPTION OF THE DRAWINGS

The invention is described in greater detail hereinafter relative to a preferred embodiment and with reference to the attached drawings, which show:

FIG. 1 a partial vertical section through an electrically heatable welding sleeve in accordance with a preferred embodiment of the present invention. The sleeve is made from thermoplastic material with two radially directed contact pins extending from the outside of the sleeve member for a plug and socket connection.

FIG. 2 a cross-section along the line II—II of FIG. 1.

FIG. 3 an enlarged representation of cutaway portion A of FIG. 1.

FIG. 4 a section along the line IV—IV of FIG. 3.

FIG. 5 a variant of the contact pin cross-section.

DESCRIPTION OF THE PREFERRED EMBODIMENTS

The electrical welding sleeve made from thermoplastic material partly shown in FIG. 1 has an electrical receptacle in the form of a contact pin 2 located in an approximately radially directed receptacle recess 3 in the wall of sleeve member 1 whose walls 4 form an effective protection against electric shock.

The sleeve member 1 of FIG. 1 comprises a supporting body 5 on whose outside is wound in separate coils an electrical resistance heating wire 6 and a sleeve outer part 7. The welding sleeve in turn comprises the sleeve member 1 and the electrical connection, i.e. the contact pin 2 arranged in recess 3.

The sleeve member 1 can be constructed in various ways. For example, the supporting body 5 can be produced in a first injection mold and can subsequently be wound. Then in a second injection molding the sleeve outer part 7 can be injection molded around the inner supporting body 5. However, it is also possible to produce the sleeve member first and then place the resistance heating wire 6 in an appropriate manner on the inside thereof, after which it is connected to the sleeve inner part.

FIGS. 2 and 3 show that contact pin 2 is connected to the supporting body 5. The resistance heating wire 6 wound onto the outside of supporting body 5 forms a loop 8 with two approximately radially directed lengths 9 passing up each side and over the contact pin 2.

From the enlarged representations of FIGS. 3 and 4, it is possible to see that the contact pin 2 is made up of two parts and comprises a support tongue 10 extending upwards in the recess and wire loop 8 with pieces 9 passing over it. As can be seen from the cross-section through contact pin 2 in FIGS. 4 and 5, the wire pieces 9 and support tongue 10 are located within a cylindrical configuration 11 defined by dotted lines, which can for example be the bore of a bushing 12 of an electrical connecting line such as is indicated schematically by dotted lines in FIG. 3. Bushing 12 is located in a virtually tolerance-free manner in recess 3 of sleeve member 1 and forms with the two wire pieces 9 of contact pin 2 a reliable electrical connection, which also ensures a good protection against electric shocks.

For the manufacture of a welding sleeve according to FIG. 1, first there is produced a supporting body 5 with the shaped-on receptacle recesses and supports 10, e.g. by injection molding in a mold. Simultaneously, a slotted circular recess wall member 15 which extends around support 10 is formed. It has two diametrically opposite guide slots 16, which are somewhat wider than the thickness of resistance heating wire 6 and extend up to the bottom of the recess 3. Slots 16 serve to prevent a displacement of the end of wire 6 in the direction of sleeve axis 17 and also prevent loop 8 from sliding off top of the support 10. Through the construction of support 10 according to the alternative configuration as shown in FIG. 5, any sliding off of loop 8 is made even more difficult, because it is constructed in stud-like manner and has a guide groove 18 for each of the pieces 9 of loop 8.

Following the production of supporting body 5, the resistance heating wire 6 is wound onto the outside thereof in spaced coils, whereby prior to the start of winding of wire 6, loop 8 is secured by bushing 12. At the end of the winding process, sleeve outer part 7 is shaped on, whereby the mold used also has a bushing 12 which projects into recess 3 and prevents the penetration of material of outer sleeve part 7. The molding of outer sleeve part 7 closes slots 16 and embeds the resistance heating wire 6. If the wall member 15 does not extend up to the external diameter of sleeve member 1, as in FIG. 3, it is covered by the material of the outer sleeve part 7.

As can be seen from FIG. 3, the base of recess 3 and a portion 19 which extends around the wall member 15 can be positioned lower than the external diameter of supporting body 5. Thus, the support 10 can be made sufficiently long, without thereby modifying the good protection against electric shocks.

In principle, the end of resistance heating wire 6 can be guided around support 10 in a fashion other than in loop 8. The essential point is that the contact pin 2 includes a support 10 around or over which is placed a portion of the end section of wire 6.

A bushing well can be formed in the sleeve member 1 in place of contact pin 2. The resistance heating wire 6 is then placed against the inner wall of the bushing well having wall slots. A contact pin is then used for securing the end of wire 6 during the winding operation in place of bushing 12. Generally, practical reasons decide whether the electrical connection in the welded sleeve is formed by a bushing well or a contact pin 2. Both constructions ensure a simple and reliable electrical connection in that a support member, i.e. the support 10 or the inside of the bushing is used on which is placed the end of the resistance heating wire 6.

Sleeve member 1 may also be constructed in one part, but use can still be made of the described construction of the electrical connection. In this case, the supporting body 5 and outer sleeve part 7 form a one-part tubular member and support 10 can be provided as a separate insert, as indicated by dotted lines in FIG. 3 on the bottom of recess 3.

While certain advantageous embodiments have been chosen to illustrate the invention, it will be understood by those skilled in the art that various changes and modifications can be made therein without departing from the scope of the invention as defined in the appended claims.

I claim:

1. An electric plug connection for an electric welding muff having an insulating thermoplastic sleeve with a spirally wound, resistance heating wire embedded therein comprising
   a recess formed in the sleeve;
   a support member formed in said recess and extending radially relative to the sleeve; and
   a portion of the wire adjacent one end thereof exposed in said recess, said portion being formed in a loop which is coupled to and supported by said support member to permit the wire to be coupled to an electrical source of energy.

2. An electric plug connection according to claim 1, wherein the heating wire has a last winding adjacent said recess; and wherein said loop is substantially coplanar with the last winding.

3. An electric plug connection according to claim 1, wherein said support member has grooves therein in which said loop is received.

4. An electric welding muff comprising
   an insulating thermoplastic sleeve extending along a longitudinal axis and having a recess formed therein;
   a support member formed in said recess and extending radially relative to said sleeve;
   a spirally wound, resistance heating wire embedded in said sleeve about said axis, a portion of said wire being formed in a loop which is exposed in said recess and coupled to and supported by said support member to permit said wire to be coupled to an electrical source of energy; and
   means for forming a second electrical connection to said wire.

5. An electric welding muff according to claim 4, wherein said heating wire has a last winding adjacent said recess, and said loop is substantially coplanar with said last winding.

6. An electric welding muff according to claim 4, wherein said support member has grooves therein in which said loop is received.

7. An electric welding muff according to claim 4, wherein said support member comprises a tongue having faces parallel to said longitudinal axis to which said loop is coupled.

8. An electric welding muff according to claim 4, wherein said recess is defined by a wall, said wall has oppositely directed guide slots through which said heating wire extends to fix it in position.

9. An electric welding muff according to claim 8, wherein said support member is wider than said slots in a direction parallel to said longitudinal axis.

10. An electric welding muff according to claim 8, wherein said sleeve comprises an inner portion and an outer portion; said recess, said wall and said guide slots are on said inner portion; said outer portion fills said guide slots after said heating wire has been located therein to fix positively said loop in position.

11. An electric welding muff according to claim 4, wherein said support member is a unitary portion of said sleeve.

12. An electric welding muff according to claim 4, wherein said means comprises a second recess formed in said sleeve, a second support member mounted in said second recess and extending radially relative to said sleeve, and a second portion of said wire being formed in a loop which is exposed in said second recess and coupled to said second support member.

* * * * *